United States Patent [19]

Ohta et al.

[11] Patent Number: 5,308,994
[45] Date of Patent: May 3, 1994

[54] CASSETTE SETTING DEVICE

[75] Inventors: Yasunori Ohta; Sadami Yamada, both of Kanagawa, Japan

[73] Assignee: Fuji Photo Film Co., Ltd., Kanagawa, Japan

[21] Appl. No.: 47,287

[22] Filed: Apr. 19, 1993

[30] Foreign Application Priority Data

Apr. 17, 1992 [JP] Japan .................................. 4-98177
Apr. 30, 1992 [JP] Japan .................................. 4-111255

[51] Int. Cl.⁵ ......................... G03D 13/00; B65H 5/00
[52] U.S. Cl. .................................. 260/589; 378/188; 414/411
[58] Field of Search ................... 250/589; 414/411; 53/266.1, 382.1; 378/188, 182

[56] References Cited

U.S. PATENT DOCUMENTS

| 4,258,264 | 3/1981 | Kotera et al. | 250/484.4 |
| 4,480,423 | 11/1984 | Müller | 53/266.1 |
| 4,590,738 | 5/1986 | Hösel et al. | 53/266.1 |
| 5,096,351 | 3/1992 | Kondoh | 414/411 |

FOREIGN PATENT DOCUMENTS 56-11395 2/1981 Japan .
63-103231 5/1988 Japan .

Primary Examiner—Constantine Hannaher
Attorney, Agent, or Firm—Sughrue, Mion, Zinn, Macpeak & Seas

[57] ABSTRACT

A cassette housing a sheet-shaped image recording medium therein and provided with an opening, through which the image recording medium is to be fed into and out of the cassette, at one end is set at a predetermined position in a cassette utilizing apparatus. The positions of two side ends of the cassette, which side ends are normal to the one end of the cassette provided with the opening, are adjusted by a pair of guide members. The other end portion of the cassette is exposed to the exterior from a cassette setting port of the cassette utilizing apparatus. At least either one of the pair of the guide members is constituted as a movable guide such that the distance between the guide members may be changed. A stationary light shielding member prevents external light from entering from the side of the other end portion of the cassette to the side of the one end of the cassette when the cassette is set. A movable light shielding member, which is capable of moving so as not to obstruct the movement of the movable guide, prevents external light from entering from the side outward from the movable guide to the side of the one end of the cassette.

14 Claims, 14 Drawing Sheets

CASSETTE SETTING DEVICE

BACKGROUND OF THE INVENTION

1. Field of the Invention

This invention relates to a device for setting a cassette, which houses therein a sheet-shaped image recording medium, such as X-ray photographic film or a stimulable phosphor sheet, at a predetermined setting position. This invention particularly relates to a cassette setting device adapted to the setting of a plurality of cassettes having different sizes.

2. Description of the Prior Art

X-ray photographic film has heretofore been known as a recording medium, on which a radiation image of an object, such as a human body, is recorded. Also, as a recording medium used for the same purposes, a sheet provided with a layer of a stimulable phosphor (hereinafter referred to as a stimulable phosphor sheet) has heretofore been known. Such stimulable phosphor sheets are disclosed in, for example, U.S. Pat. No. 4,258,264 and Japanese Unexamined Patent Publication No. 56(1981)-11395. When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

A radiation image of an object is recorded on a stimulable phosphor sheet by, for example, exposing the stimulable phosphor sheet to radiation, which has passed through the object. The stimulable phosphor sheet, on which the radiation image has been stored, is then scanned two-dimensionally with stimulating rays, such as a laser beam, which cause it to emit light in proportion to the amount of energy stored during exposure to the radiation. The light emitted by the stimulable phosphor sheet, upon stimulation thereof, is photoelectrically detected. In this manner, an electric image signal representing the radiation image can be obtained.

Ordinarily, the stimulable phosphor sheet or the X-ray photographic film described above is housed in a light-tight cassette or a light-tight magazine. Each cassette serves to house a single sheet-shaped image recording medium, such as a stimulable phosphor sheet, therein. In general, the cassette is constituted of a box member provided with an opening, through which a recording medium is to be fed into and out of the box member, at a portion, and a cover member, which is mounted on the box member via a swing axis approximately parallel to the sheet-shaped image recording medium having been housed in the box member and which opens and closes the opening by swinging around the swing axis.

When the cassette is used during an operation for recording a radiation image on the stimulable phosphor sheet, or the like, the cassette is located at a position for exposure to, for example, radiation having passed through an object. The stimulable phosphor sheet, or the like, which has been housed in the cassette, is exposed to radiation, and a radiation image is thereby recorded thereon.

When a cassette is loaded to, for example, an radiation image read-out apparatus for reading out a radiation image from an image recording medium, such as a stimulable phosphor sheet, on which the radiation image has been stored, it is necessary to set the cassette accurately at a predetermined position such that the image recording medium housed in the cassette may be automatically conveyed out of the cassette and such that the image recording medium, from which the radiation image has been read out, may be automatically returned into the cassette. In general, a device for setting the cassette in such a manner is constituted such that the positions of two side ends of the cassette may be adjusted from the exterior by a pair of guide members. The cassette is inserted into the cassette setting device such that one end of the cassette provided with an opening, through which the image recording medium is to be fed into and out of the cassette, (i.e., the end of the cassette which is normal to the two side ends thereof) may first enter the cassette setting device. The two side ends of the cassette are guided by the guide members, and the cassette is thereby set at the predetermined position.

In the past, a cassette was provided with a cover member having the same size as the entire area of the upper surface of the cassette. Recently, as disclosed in, for example, Japanese Unexamined Patent Publication No. 63(1988)-103231, a cassette has been proposed which is provided with a comparatively small cover member occupying a portion of the entire area of the upper surface of the cassette. In general, when the cassette provided with such a small cover member is loaded to a radiation image read-out apparatus, or the like, instead of the entire cassette being loaded into the radiation image read-out apparatus, or the like, only a portion of the cassette adjacent its one end, which is opened and closed by the cover member, is accommodated in the apparatus, and the portion of the cassette adjacent the other end thereof is projected out of the apparatus. Specifically, in such cases, the space in the radiation image read-out apparatus, or the like, for accommodating the cassette can be kept small, and therefore the size of the radiation image read-out apparatus, or the like, can be kept small.

The radiation image read-out apparatus, or the like, is often constituted such that a plurality of image recording media having different sizes may be processed therein. In such cases, various cassettes having different sizes are utilized. However, in cases where cassettes having different sizes are to be processed, the conventional cassette setting device is constituted so as to accommodate the entire cassette in the radiation image read-out apparatus, or the like. Specifically, the conventional cassette setting device is not constituted such that only a portion of the cassette adjacent its one end, which is opened and closed by the cover member, may be accommodated in the region inside of the radiation image read out apparatus, or the like.

The reasons for the above are that it becomes difficult to shield the region inside of the radiation image read-out apparatus, or the like, from external light. Specifically, when a cassette is loaded to the radiation image read-out apparatus, or the like, wherein various processes are carried out on an image recording medium, such as a stimulable phosphor sheet or X-ray photographic film, the apparatus must be shielded from external light such that no external light may enter the region inside of the apparatus. In cases where only a portion of a cassette adjacent its one end is accommodated in the region inside of the radiation image read-out apparatus, or the like, if cassettes having the same size are always processed, the light shielding can be effected without difficulty. However, in cases where cassettes having different sizes are to be processed, if a cassette having a comparatively small size is loaded to the radiation image read-out apparatus, or the like, external light will easily enter the region inside of the apparatus from spaces occurring on the two sides of the cassette.

As described above, for reasons of the light shielding, a cassette has heretofore been loaded to the radiation image read-out apparatus, or the like, such that the entire cassette may be accommodated in the apparatus. In such cases, the radiation image read-out apparatus, or the like, must be provided with the space for accommodating the entire cassette, and therefore the size of the apparatus cannot be kept small.

SUMMARY OF THE INVENTION

The primary object of the present invention is to provide a cassette setting device, wherein each of cassettes having different sizes is set such that only a portion of the cassette adjacent its one end, which is opened and closed by a cover member of the cassette, may be accommodated in the region inside of a radiation image read-out apparatus, or the like.

Another object of the present invention is to provide a cassette setting device, wherein each of cassettes having different sizes is set easily and quickly in a radiation image read-out apparatus, or the like.

The present invention provides a first cassette setting device for setting a cassette at a predetermined position in a cassette utilizing apparatus, the cassette housing a sheet-shaped image recording medium therein and being provided with an opening, through which the image recording medium is to be fed into and out of the cassette, at one end, the cassette setting device setting the cassette such that the positions of two side ends of the cassette, which side ends are normal to the one end of the cassette provided with the opening, may be adjusted by a pair of guide members, and such that the other end portion of the cassette may be exposed to the exterior from a cassette setting port of the cassette utilizing apparatus, wherein the improvement comprises constituting at least either one of the pair of the guide members as a movable guide such that the distance between the guide members may be changed, and providing: i) a stationary light shielding member, which prevents external light from entering from the side of the other end portion of the cassette to the side of the one end of the cassette when the cassette is set, and ii) a movable light shielding member, which is capable of moving so as not to obstruct the movement of the movable guide and which prevents external light from entering from the side outward from the movable guide to the side of the one end of the cassette.

With the first cassette setting device in accordance with the present invention, one of cassettes having different sizes can be set by moving the movable guide so as to correspond to the width of each cassette.

Also, with the first cassette setting device in accordance with the present invention wherein the movable light shielding member is provided, even if a cassette having a comparatively small size is set and a space unoccupied by the cassette (i.e. part of a space in which a large-sized cassette is to be accommodated when it is set) occurs along the side of the cassette, external light can be prevented from entering through the unoccupied space to the side of the opening of the cassette.

The present invention also provides a second cassette setting device for setting a cassette at a predetermined position in a cassette utilizing apparatus, the cassette housing a sheet-shaped image recording medium therein and being provided with an opening, through which the image recording medium is to be fed into and out of the cassette, at one end, the cassette setting device setting the cassette such that the positions of two side ends of the cassette, which side ends are normal to the one end of the cassette provided with the opening, may be adjusted by a pair of guide members, and such that the other end portion of the cassette may be exposed to the exterior from a cassette setting port of the cassette utilizing apparatus, wherein the improvement comprises the provision of:

i) a pair of guide members, which serves as the pair of the guide members for a large-sized cassette having a comparatively large width, ii) a pair of guide members, which serves as the pair of the guide members for a small-sized cassette having a comparatively small width, at least either one of the pair of the guide members for the small-sized cassette, which one is located at a position for the setting of the large-sized cassette, being capable of moving between a retracted position, that does not interfere with the large-sized cassette, and a position for the guiding of the small-sized cassette, iii) a movable light shielding member, which is located in the vicinity of the cassette setting port, which prevents external light from entering from the cassette setting port to the side of the one end of the cassette when the small-sized cassette is set, and which is moved by the large-sized cassette to a retracted position, that does not obstruct the passage of the large-sized cassette, when the large-sized cassette passes through the location of the movable light shielding member, and iv) an interlocking mechanism for interlocking the movable light shielding member and the guide member for the small-sized cassette, which guide member is located at the position for the setting of the large-sized cassette, with each other such that the guide member for the small-sized cassette may be moved to the retracted position thereof when the movable light shielding member is moved to the retracted position thereof.

With the second cassette setting device in accordance with the present invention, each of the large-sized cassette and the small-sized cassette can be set at the predetermined position by respectively using the guide members for the large-sized cassette and the guide members for the small-sized cassette. One of the pair of the guide members for the large-sized cassette and one of the pair of the guide members for the small-sized cassette may be common to each other.

The cassette setting port must have a size such that the large-sized cassette can pass therethrough. Therefore, when the small-sized cassette is set, a portion of the cassette setting port remains unoccupied by the cassette. However, in the second cassette setting device in accordance with the present invention, the movable light shielding member is provided, and external light can thereby be prevented from entering through the portion of the cassette setting port to the side of the opening of the cassette.

Also, when the large-sized cassette is set, the guide member for the small-sized cassette moves to the retracted position that does not interfere with the large-sized cassette. Therefore, the large-sized cassette can be set smoothly.

Additionally, with the second cassette setting device in accordance with the present invention, no operation is required to change over the guide members for the cassettes and the light shielding member when the small-sized cassette is set and when the large-sized cassette is set. Therefore, with the second cassette setting device in accordance with the present invention, cassettes having various different sizes can be set easily and quickly.

DESCRIPTION OF THE PREFERRED EMBODIMENTS

The present invention will hereinbelow be described in further detail with reference to the accompanying drawings.

Figure 1:
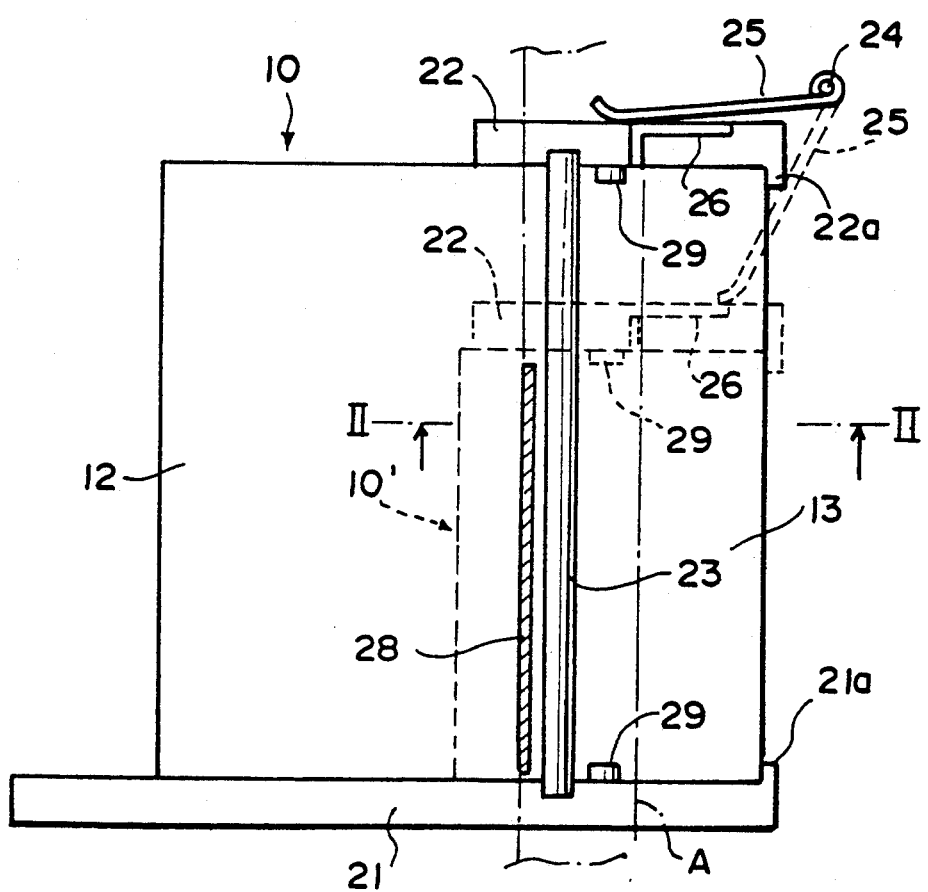
FIG. 1 is a plan view showing a first embodiment of the first cassette setting device in accordance with the present invention.
Figure 2:
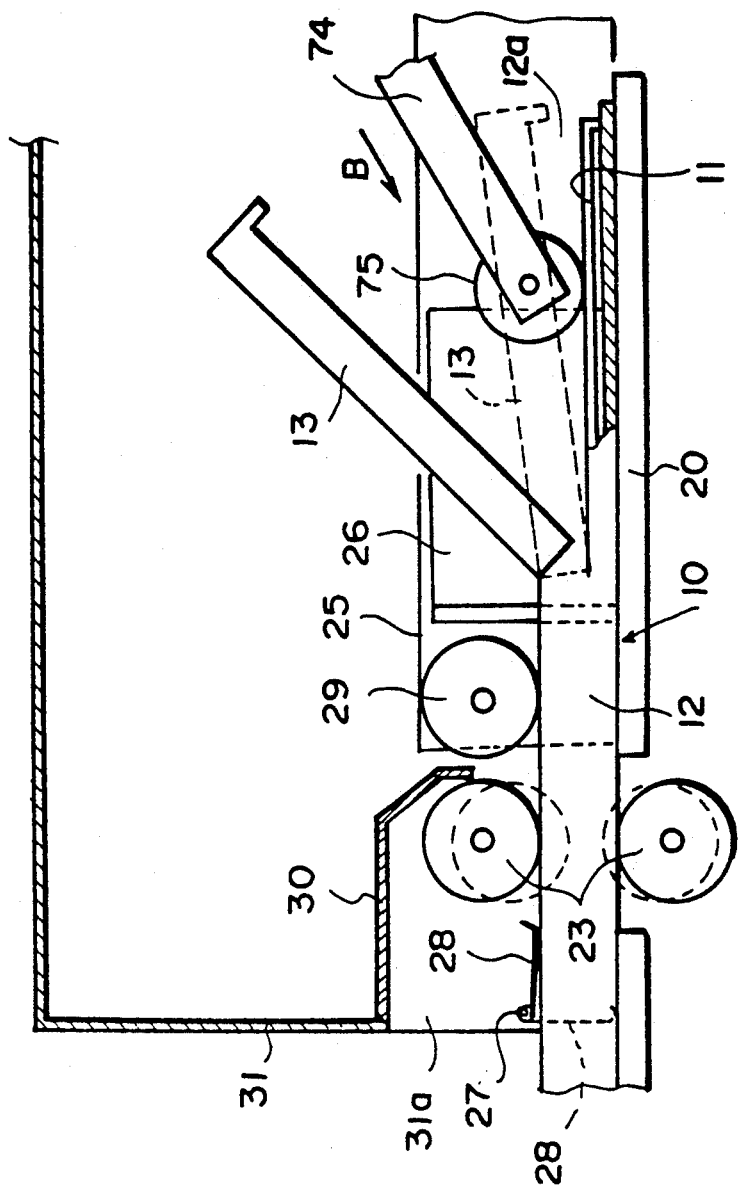
FIG. 2 is a partially cutaway side view showing the first embodiment of the first cassette setting device in accordance with the present invention.

FIG. 1 shows a first embodiment of the first cassette setting device in accordance with the present invention. FIG. 2 is a side view taken along line II—II of FIG. 1. By way of example, the cassette setting device is built in a radiation image read-out apparatus 40 shown in FIG. 5 in order to set either one of a comparatively large-sized cassette 10 (which is indicated by the solid line in FIG. 1) and a comparatively small-sized cassette 10' (which is indicated by the broken line in FIG. 1) at a predetermined position.

The cassette 10 will be described hereinbelow with reference to FIG. 4. By way of example, the cassette 10 houses a stimulable phosphor sheet 11 therein and comprises a thin box member 12 and a cover member 13 for opening and closing an opening 12a, which is formed in the box member 12 and through which the stimulable phosphor sheet 11 is to be fed into and out of the box member 12. By way of example, the box member 12 and the cover member 13 are constituted of a synthetic resin. The cover member 13 is mounted on the box member 12 such that the cover member 13 can swing around a swing axis A, which is approximately parallel to the stimulable phosphor sheet 11 having been housed in the box member 12. The cover member 13 opens and closes the opening 12a by swinging in this manner. Such that the cover member 13 can thus swing, for example, a known hinge mechanism may be employed. Alternatively, the box member 12 and the cover member 13 may be integrally molded by using a synthetic resin such that the cover member 13 can be bent along a hinge line with respect to the box member 12.

Basically, the small-sized cassette 10' is constituted in the same manner as that in the large-sized cassette 10, except for the cassette size. In the cassettes 10 and 10', the length of the cover member 13 (i.e. the length from the swing axis A to the leading end of the cover member 13) is kept the same such that the stimulable phosphor sheet 11 can be taken out of and housed in each of the cassettes 10 and 10' by utilizing a common means.

A radiation image is stored on the stimulable phosphor sheet 11 having been housed in the cassette 10 or the cassette 10', and the cassette 10 or the cassette 10' is then loaded to the cassette setting device shown in FIGS. 1 and 2. How the cassette setting device is constructed will be described hereinbelow. As illustrated, the cassette setting device comprises a support base 20 o which the cassette 10 or the cassette 10' is placed, a fixed guide member 21 which adjusts the position of the right side end of the cassette 10 or the cassette 10' (i.e. the lower end thereof in FIG. 1) from the exterior of the cassette 10 or the cassette 10', and a movable guide member 22 which is located parallel to the fixed guide member 21 and which is spaced apart therefrom in the width direction of the cassette 10 or the cassette 10'. The cassette setting device also comprises a pair of light shielding rollers 23, 23 which serve as a stationary light shielding member, and a movable light shielding plate 25 which is constituted of a flat spring and which can swing around a shaft 24 in FIG. 1. The cassette setting device further comprises a light shielding plate 26 which is secured to the movable guide member 22, and a door member 28 which can swing around a shaft 27 extending along the width direction of the cassette 10 or the cassette 10′.

Figure 3:
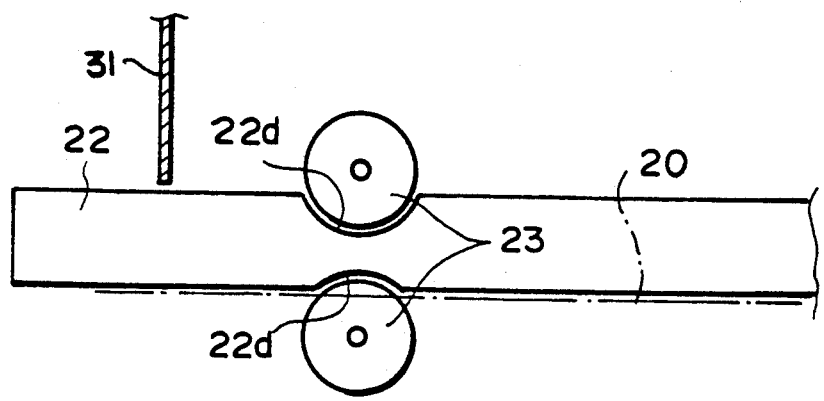
FIG. 3 is a partially cutaway side view showing the major part of the first embodiment of the first cassette setting device in accordance with the present invention.

The movable guide member 22 is guided by slide rails (not shown) and can be moved along the width direction of the cassette 10 or the cassette 10′ (i.e. vertically in FIG. 1). The movable guide member 22 is fixed by known click means (not shown) at the position indicated by the solid line in FIG. 1 at which the distance between the movable guide member 22 and the fixed guide member 21 is slightly larger than the width of the large-sized cassette 10, and at the position indicated by the broken line in FIG. 1 at which the distance between the movable guide member 22 and the fixed guide member 21 is slightly larger than the width of the small-sized cassette 10′. As illustrated in FIG. 3, the movable guide member 22 has circular arc-like cutaway portions 22d, 22d at portions corresponding to the pair of the light shielding rollers 23, 23 such that it may not interfere with the pair of the light shielding rollers 23, 23.

Lock rollers 29, 29 are respectively mounted on the movable guide member 22 and the fixed guide member 21 such that the lock rollers 29 29 can rotate. Each roller of the pair of the light shielding rollers 23, 23 is slightly longer than the width of the large-sized cassette 10. The pair of the light shielding rollers 23, 23 are urged by an urging means (not shown) towards each other and are kept in slightly spaced relation to each other by stoppers (not shown). The radiation image read-out apparatus 40 is provided with a frame 30, which covers the upper roller of the pair of the light shielding rollers 23, 23, and a frame 31 which has a cassette setting port 31a.

How the cassette setting device operates will be described hereinbelow. When the large-sized cassette 10 is set, the movable guide member 22 is set at the position indicated by the solid line in FIG. 1. The movable light shielding plate 25 constituted of the flat spring is urged by the spring force counter-clockwise around the shaft 24 in FIG. 1 such that the leading end of the movable light shielding plate 25 may always be in close contact with the light shielding plate 26, which is secured to the movable guide member 22.

When the large-sized cassette 10 is set, its one end provided with the opening 12a is inserted through the cassette setting port 31a of the frame 31 into the space between the pair of the light shielding rollers 23, 23. At this time, the door member 28, which has been suspended in a vertical orientation by gravity, is turned upwardly by the large-sized cassette 10. Also, the pair of the light shielding rollers 23, 23 are slightly moved away from each other and receive the large-sized cassette 10 therebetween. When the cassette 10 has been inserted to a predetermined position, the leading end thereof comes into contact with stoppers 21a and 22a, which are respectively formed on the fixed guide member 21 and the movable guide member 22, and the cassette 10 is thereby set at the predetermined position.

Thereafter, as shown in FIG. 2, the cover member 13 is opened by an appropriate method, and a roller arm 74, which supports a roller 75 at a leading end, is moved in the direction indicated by the arrow B, i.e. towards the inner part of the large-sized cassette 10. At the time at which the roller 75 comes into contact with the stimulable phosphor sheet 11 housed in the large-sized cassette 10, the roller arm 74 is stopped. The roller 75 is then rotated counter-clockwise in FIG. 2 by a drive means (not shown). In this manner, the stimulable phosphor sheet 11 which is in contact with the roller 75 is conveyed through the opening 12a to the exterior of the cassette 10.

The stimulable phosphor sheet 11, which has thus been conveyed out of the cassette 10, is conveyed into a read-out section 62 via an erasing section 60 by a sheet conveying system, which is constituted of guide plates 46, 47, 48 and nip rollers 45, 49, 50, 51, 52, 53, 54, 55, 56, 57, and the like. In the read-out section 62, the radiation image stored on the stimulable phosphor sheet 11 is read out with a method disclosed in, for example, U.S. Pat. No. 4,258,264. How such a read-out operation is carried out will be briefly described hereinbelow. The stimulable phosphor sheet 11 is conveyed by the nip rollers 55, 56, and 57 at a predetermined speed in the sub-scanning direction indicated by the arrow H in FIG. 5. A laser beam 64 serving as stimulating rays is radiated from a main scanning optical system 63. The laser beam 64 scans the stimulable phosphor sheet 11 in the main scanning direction, which is approximately normal to the sub-scanning direction indicated by the arrow H.

When the stimulable phosphor sheet 11 is exposed to the laser beam 64, the exposed portion of the stimulable phosphor sheet 11 emits light in an amount proportional to the amount of energy stored thereon during its exposure to the radiation. The emitted light is guided by a light guide member 65 and detected by a photodetector 66, which may be constituted of a photomultiplier, or the like. The photodetector 66 generates an output signal S representing the radiation image stored on the stimulable phosphor sheet 11. The signal S is then fed into an image reproducing apparatus, such as a CRT display device or a light beam scanning recording apparatus, and used during the reproduction of the radiation image. In this manner, the radiation image, which was stored on the stimulable phosphor sheet 11, is reproduced as a visible image.

After the radiation image has been read out from the stimulable phosphor sheet 11, the nip rollers 45 and 49 through 57 are rotated reversely, and the stimulable phosphor sheet 11 is conveyed from the read-out section 62 to the erasing section 60, which is provided with a plurality of erasing light sources 61, 61, ..., and then towards the cassette loading section. When the stimulable phosphor sheet 11 passes through the erasing section 60, the erasing light sources 61, 61, ... are turned on in order to produce erasing light, and the stimulable phosphor sheet 11 is exposed to the erasing light. In this manner, energy remaining on the stimulable phosphor sheet 11 after the radiation image has been read out therefrom is released from the stimulable phosphor sheet 11, and the stimulable phosphor sheet 11 can then be reused for the recording of a radiation image.

The erased stimulable phosphor sheet 11 is conveyed by the roller 75, which now rotates reversely, i.e. clockwise, into the cassette 10. Thereafter, operations reverse to the operations for taking the stimulable phosphor sheet 11 out are carried out, and the cover closing and locking are thereby carried out on the cassette 10. Specifically, the roller arm 74 moves in the direction opposite to that indicated by the arrow B and returns to the waiting position outside of the cassette 10. Thereafter, the cover member 13, which has been opened largely, is returned to the slight open state (which is indicated by the broken line in FIG. 2) by the means which opened the cover member 13 in the manner described above. A detection means detects that the roller 75 has returned to the waiting position and, for example, this state of the roller 75 is indicated by an indicator, or the like. An operator of the apparatus then pulls the cassette 10 out of the cassette setting port 31a. When the cassette 10 is thus pulled out, the cover member 13 is pushed by a pair of the lock rollers 29, 29 from above, and locking claws (not shown) of the cover member 13 and of the box member 12 engage with each other. In this manner, the cover member 13 is locked to the box member 12.

When the large-sized cassette 10 is set in the manner described above, the region around the opening 12a formed at one end of the cassette 10 must be shielded from external light. In this case, the light shielding is accomplished by the frames 30 and 31, the fixed guide member 21, the movable guide member 22, and the pair of the light shielding rollers 23, 23 which serve as the stationary light shielding member. Any of other small gaps may be shielded from light by use of known materials, such as sponges or light blocking cloths.

How the small-sized cassette 10' is set will be described hereinbelow. In this case, the movable guide member 22 is set at the position indicated by the broken line in FIG. 1. The operations for taking the stimulable phosphor sheet 11 out of the small-sized cassette 10' and housing it in the small-sized cassette 10' are carried out in the same manner as that for the large-sized cassette 10.

How the light shielding is effected when the small-sized cassette 10' is set will be described hereinbelow. When the movable guide member 22 is moved from the position indicated by the solid line shown in FIG. 1 to the position indicated by the broken line, the movable light shielding plate 25, which is urged in the manner described above, follows the movement of the light shielding plate 26 and is kept in contact therewith. When the movable guide member 22 is set at the position indicated by the broken line in FIG. 1, the movable light shielding plate 25 takes the position indicated by the broken line. In this case, basically, the light shielding is accomplished in the same manner as that when the large-sized cassette 10 is set. However, in this case, unlike the setting of the large-sized cassette 10, a gap unoccupied by the small-sized cassette 10' occurs between the pair of the light shielding rollers 23, 23 on the side outward from the movable guide member 22.

However, in this embodiment, the movable light shielding plate 25 is always kept in contact with the light shielding plate 26. Therefore, even if external light enters through the gap between the pair of the light shielding rollers 23, 23 to the region inside of the cassette setting device, the external light is blocked by the movable light shielding plate 25 and the light shielding plate 26, and does not reach the side of the opening 12a of the cassette 10'. Accordingly, in this case, good light shielding effects can be obtained.

In cases where no cassette is set, the movable guide member 22 is set at the position indicated by the broken line in FIG. 1. In such cases, the stimulable phosphor sheet 11 is not present in the radiation image read-out apparatus 40, and therefore the light shielding need not be effected. However, in this embodiment, the door member 28 is suspended by gravity and takes the position indicated by the broken line in FIG. 2. Therefore, in the region between the fixed guide member 21 and the movable guide member 22, any dust, or the like, can be prevented from entering through the gap between the pair of the light shielding rollers 23, 23 to the region inside of the cassette setting device. Also, at this time, the movable light shielding plate 25 is in contact with the light shielding plate 26, and therefore the effects of preventing the entry of dust, or the like, can be obtained from the movable light shielding plate 25 and the light shielding plate 26.

Figure 6:
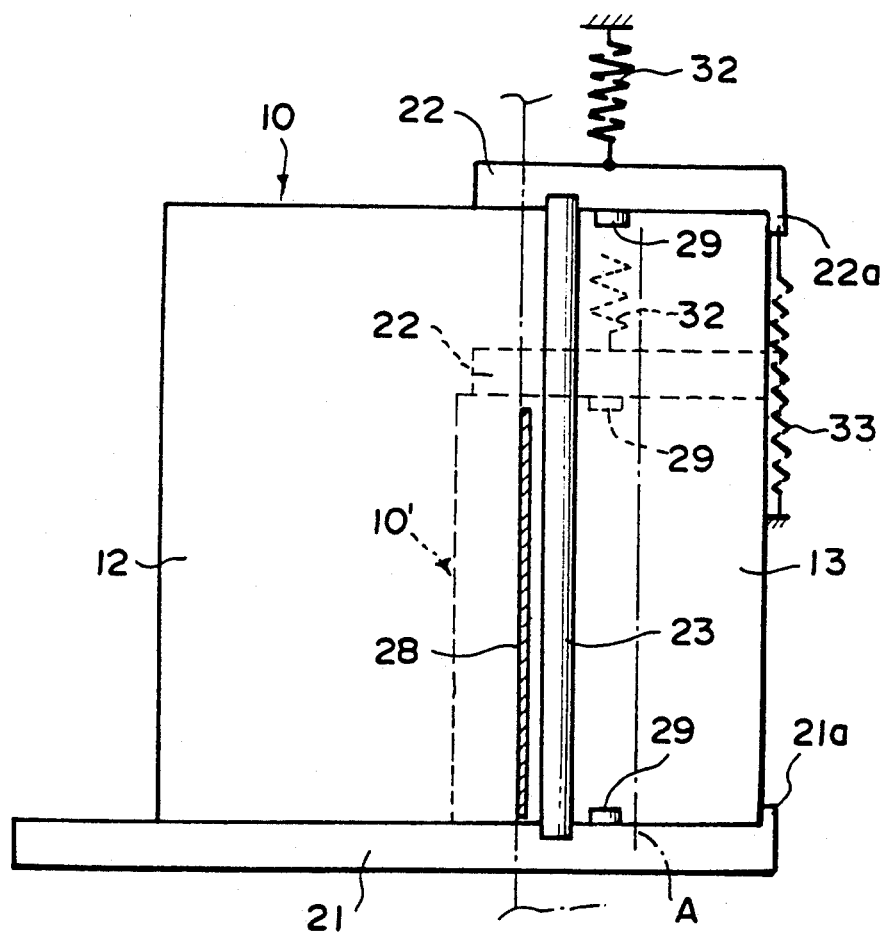
FIG. 6 is a plan view showing a second embodiment of the first cassette setting device in accordance with the present invention.

A second embodiment of the first cassette setting device in accordance with the present invention will be described hereinbelow with reference to FIG. 6. In FIG. 6, similar elements are numbered with the same reference numerals with respect to FIG. 1. (This also applies to FIGS. 7 through 14.)

In the second embodiment shown in FIG. 6, one end of a bellows type of movable light shielding plate 32 is connected to the movable guide member 22. The other end of the movable light shielding plate 32 is secured to the main body of the radiation image read-out apparatus 40. The movable guide member 22 is urged by a tension spring 33 such that it may return to the position for the setting of the small-sized cassette 10' (i.e. the position indicated by the broken line).

In the second embodiment, the movable light shielding plate 32 is always present on the side outward from the movable guide member 22. Therefore, when the movable guide member 22 is located at the position for the setting of the small-sized cassette 10', external light, which enters through the gap between the pair of the light shielding rollers 23, 23 on the side outward from the movable guide member 22 into the region inside of the cassette setting device, is blocked by the movable light shielding plate 32 and does not enter the side of the stimulable phosphor sheet take-out opening of the small-sized cassette 10'.

Figure 7:
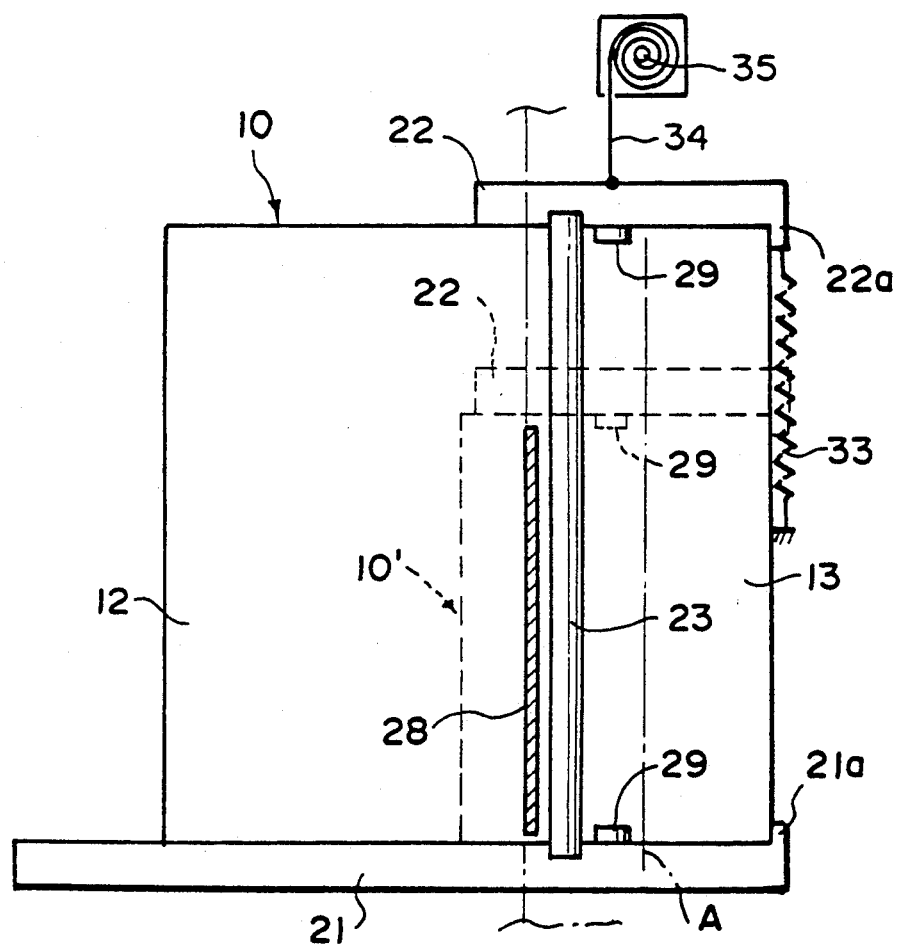
FIG. 7 is a plan view showing a third embodiment of the first cassette setting device in accordance with the present invention.

A third embodiment of the first cassette setting device in accordance with the present invention will be described hereinbelow with reference to FIG. 7. In the third embodiment, one end of a measuring tape type of movable light shielding plate 34 is secured to the movable guide member 22. The other end of the movable light shielding plate 34 is secured to a wind-up shaft 35. The wind-up shaft 35 is urged by an urging means (not shown) so as to rotate clockwise in FIG. 7 such that the movable light shielding plate 34 may be wound up automatically. In this embodiment, when the small-sized cassette 10' is set, the light shielding is effected in the same manner as that in the second embodiment.

The movable light shielding plate 34 is constituted of a sheet material, such as a cloth or a plastic film. Alternatively, the movable light shielding plate 34 may be constituted of a Venetian blind-like member.

With the first, second, and third embodiments of the first cassette setting device in accordance with the present invention, three or more kinds of cassettes having different sizes can be set. Embodiments of the first cassette setting device in accordance with the present invention, wherein only two kinds of cassettes having different sizes can be set, will be described hereinbelow.

Figure 8:
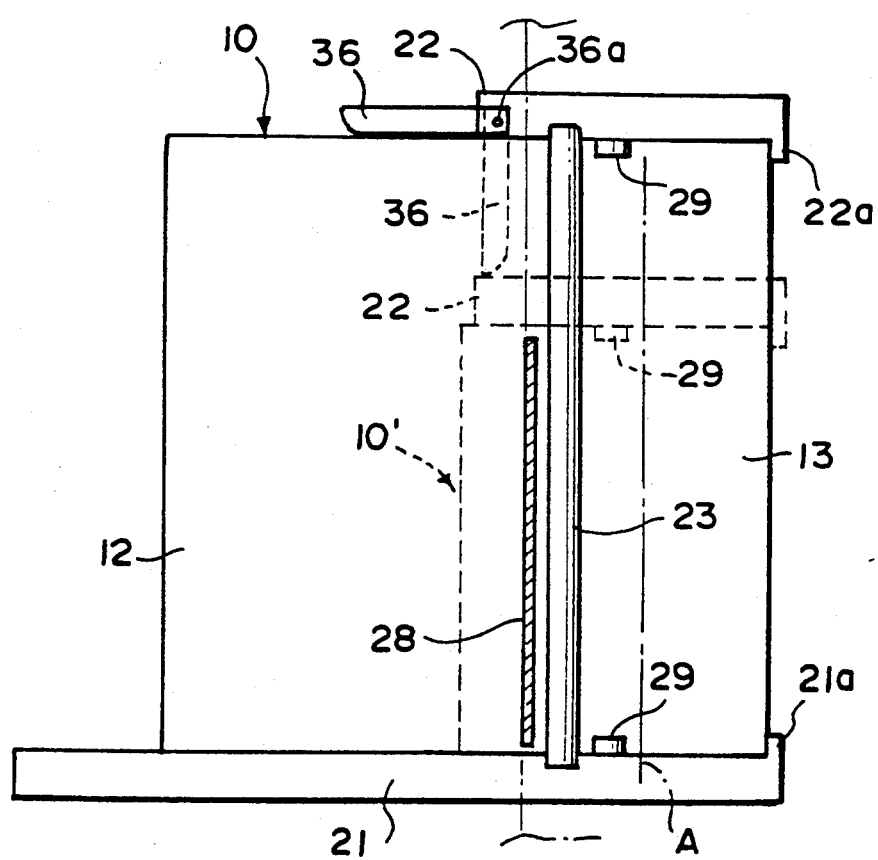
FIG. 8 is a plan view showing a fourth embodiment of the first cassette setting device in accordance with the present invention.

FIG. 8 shows a fourth embodiment of the first cassette setting device in accordance with the present invention. In this embodiment, a movable light shielding cover 36 is provided such that it can turn around a turning shaft 36a, which is secured to the main body of the radiation image read-out apparatus 40. When the large-sized cassette 10 is set, the movable light shielding cover 36 is set at the position indicated by the solid line in FIG. 8. When the small-sized cassette 10' is set, the movable light shielding cover 36 is manually turned and set at the position indicated by the broken line, at which a leading end of the movable light shielding cover 36 comes into contact with the movable guide member 22. In this manner, when the small-sized cassette 10' is set, external light can be prevented from entering through the gap between the pair of the light shielding rollers 23, 23 on the side outward from the movable guide member 22 into the region inside of the cassette setting device.

Figure 9:
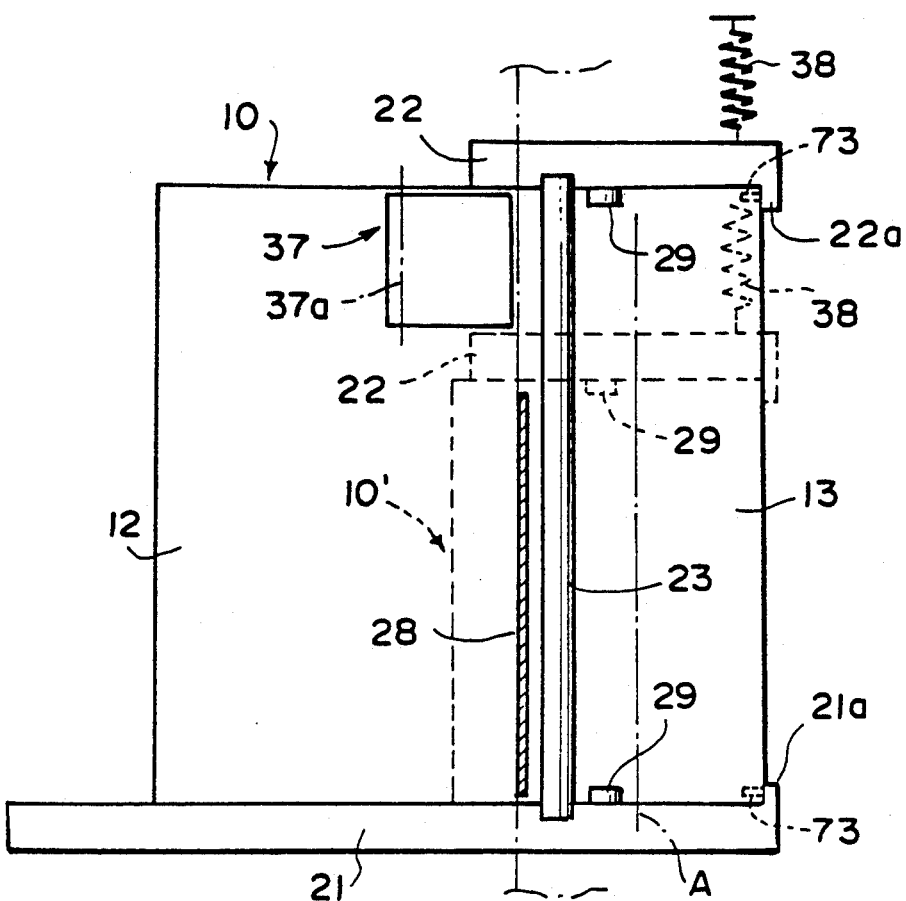
FIG. 9 is a plan view showing a fifth embodiment of the first cassette setting device in accordance with the present invention.

FIG. 9 shows a fifth embodiment of the first cassette setting device in accordance with the present invention. This embodiment is provided with a movable light shielding cover 37. When the large-sized cassette 10 is set, an outer side end of the movable light shielding cover 37 comes into contact with the inner side end of the movable guide member 22. When the small-sized cassette 10' is set, an inner side end of the movable light shielding cover 37 comes into contact with the outer side end of the movable guide member 22. The movable guide member 22 is urged by a tension spring 38 so as to return to the position for the setting of the large-sized cassette 10 (i.e. the position indicated by the solid line).

Figure 10:
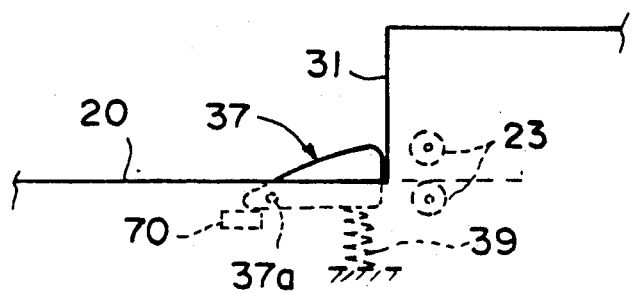
FIG. 10 is a side view showing the major part of the fifth embodiment of the first cassette setting device in accordance with the present invention.

As illustrated in FIG. 10, the movable light shielding cover 37 has a wedge-like sectional shape and is supported such that it can turn around a turning shaft 37a. Also, the movable light shielding cover 37 is urged by a compression coiled spring 39 in a counter-clockwise turning direction around the turning shaft 37a in FIG. 10. If no other external force is applied to the movable light shielding cover 37, the leading end thereof is brought into contact with a stopper 70, which is mounted on the main body of the radiation image read-out apparatus 40. The movable light shielding cover 37 is thus set at the position shown in FIG. 10.

In the embodiment of FIG. 9, when the small-sized cassette 10' is set, the movable light shielding cover 37 is located at the position facing the pair of the light shielding rollers 23, 23 on the side outward from the movable guide member 22. Therefore, external light is prevented from entering through the gap between the pair of the light shielding rollers 23, 23 into the cassette setting device.

When the small-sized cassette 10' is set, the movable guide member 22, which is urged by the tension spring 38, is brought into contact with the side face of the movable light shielding cover 37 and is thereby set at the predetermined position. When the large-sized cassette 10 is set, the large-sized cassette 10 is pushed forwardly on the support base 20. At this time, the movable light shielding cover 37 is pushed down by the cassette 10 and sinks to the position lower than the support base 20. Therefore, the movable guide member 22, which is urged by the tension spring 38, automatically retracts to the position indicated by the solid line in FIG. 9.

During the returning from the large-sized cassette setting state to the small-sized cassette setting state, the movable light shielding cover 37 is manually pushed down to the position lower than the support base 20. While the movable light shielding cover 37 is kept in this state, the movable guide member 22 is moved to the side inward from the movable light shielding cover 37. In order for this operation to be carried out smoothly, the movable light shielding cover 37 should preferably be shaped such that its left side face (i.e. its upper side face in FIG. 9) and its upper surface may continue to each other via a gentle slant surface.

As illustrated in FIG. 9, the stopper 21a of the fixed guide member 21 and the stopper 22a of the movable guide member 22 may respectively be provided with lock releasing pins 73, 73. Each of the lock releasing pins 73, 73 passes through a pin passage hole, which is formed in the leading end face of the cassette 10 or the cassette 10', and enters the cassette in order to release the engagement of locking members, which locks the cover member 13 in the closed state. (An example of such a lock releasing pin is disclosed in, for example, Japanese Unexamined Patent Publication No. 63(1988)-103231.)

Figure 13:
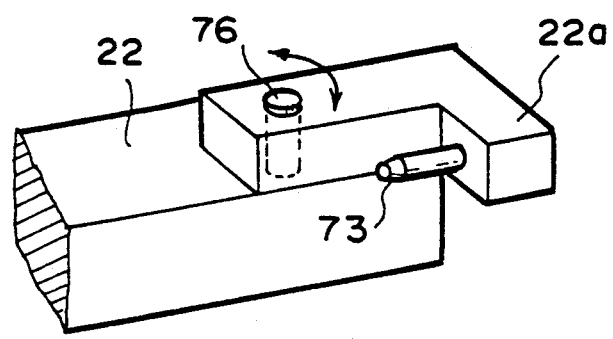
FIG. 13 is a perspective view showing an example of a cassette stopper employed in the first cassette setting device in accordance with the present invention.
Figure 14:
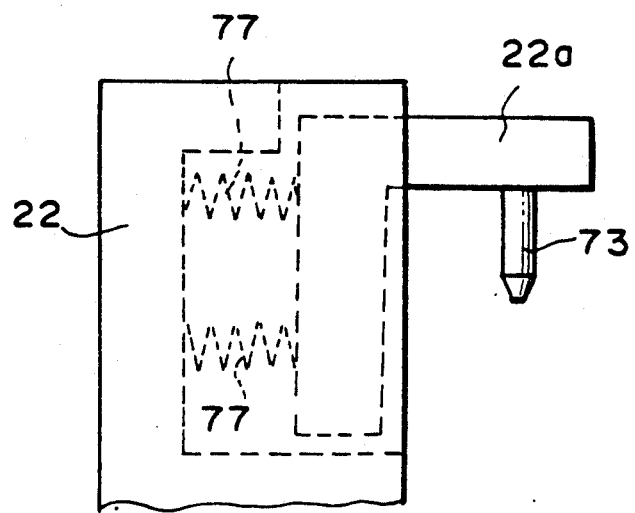
FIG. 14 is a plan view showing a different example of a cassette stopper employed in the first cassette setting device in accordance with the present invention.

In cases where such a lock releasing pin 73 is provided, if the structure is such that the movable guide member 22 is not pushed against the cassette 10 or the cassette 10' as in the cassette setting device shown in FIG. 9, it will often occur due to various tolerances (e.g. fluctuations in dimensions of parts, fluctuations in assembly accuracy, and cassette dimension tolerance) that each lock releasing pin 73 cannot smoothly enter the pin passage hole formed in the cassette 10 or the cassette 10'. In order for such problems to be eliminated, for example, as illustrated in FIG. 13, the stopper 22a, to which the lock releasing pin 73 is secured, should preferably be mounted on the movable guide member 22 by a turning shaft 76 such that the stopper 22a can slightly turn around the turning shaft 76. Alternatively, as illustrated in FIG. 14, the stopper 22a, to which the lock releasing pin 73 is secured, should preferably be mounted on the movable guide member 22 by coiled springs 77, 77 such that the stopper 22a can slightly move.

Figure 11:
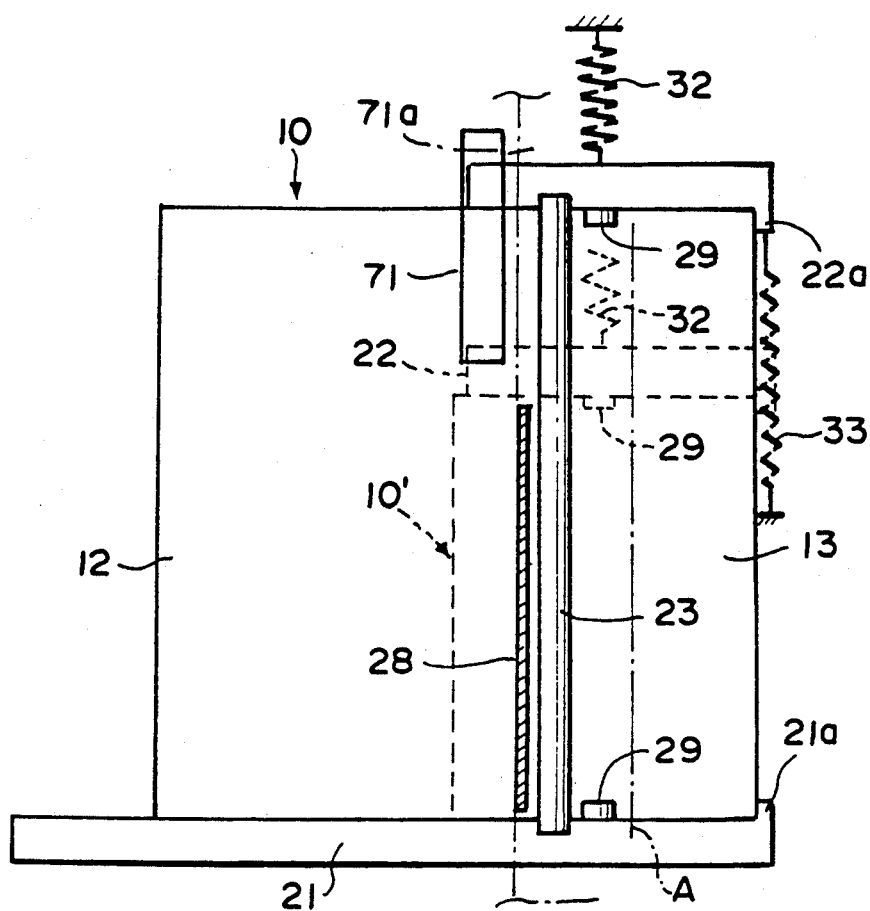
FIG. 11 is a plan view showing a sixth embodiment of the first cassette setting device in accordance with the present invention.
Figure 12:
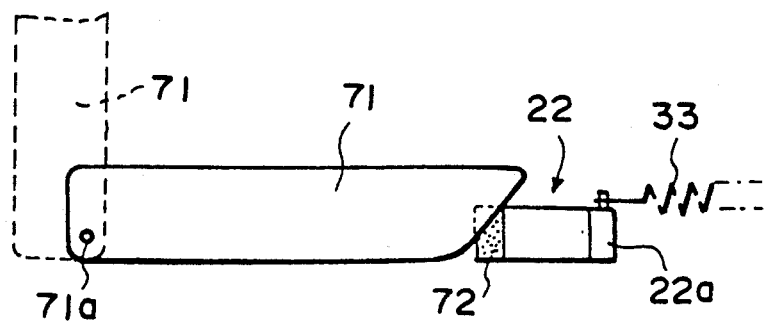
FIG. 12 is a front view showing the major part of the sixth embodiment of the first cassette setting device in accordance with the present invention.

FIG. 11 shows a sixth embodiment of the first cassette setting device in accordance with the present invention. This embodiment is provided with a movable light shielding cover 71, which can turn around a turning shaft 71a. As illustrated in the front view in FIG. 12, the movable light shielding cover 71 has a tapered leading end and is urged by an urging means (not shown) so as to turn clockwise in FIG. 12 around a turning shaft 71a. Therefore, when the small-sized cassette 10' is set, the leading end of the movable light shielding cover 71 is brought into contact with the movable guide member 22, and the movable light shielding cover 71 takes the horizontal position. In this state, the movable light shielding cover 71 stands facing the gap between the pair of the light shielding rollers 23, 23 on the side outward from the movable guide member 22 and thus blocks external light. A light shielding sponge 72 for ensuring the light shielding is secured to the outer side end face of the movable guide member 22.

When the movable guide member 22 is moved towards the outer side during the setting of the large-sized cassette 10, the movable light shielding cover 71 is pushed up against the urging force. At the time at which the movable guide member 22 comes to the position for the setting of the large-sized cassette 10 (i.e. the position indicated by the solid line in FIG. 11), the movable light shielding cover 71 is brought to the upright position such that it may not obstruct the movable guide member 22 from being set at the predetermined position.

In the aforesaid embodiments of the first cassette setting device in accordance with the present invention, the cassette 10 or the cassette 10', in which the stimulable phosphor sheet 11 is housed, is set. The first cassette setting device in accordance with the present invention is also applicable when a cassette, in which a sheet-shaped image recording medium other than the stimulable phosphor sheet is housed, is set.

Embodiments of the second cassette setting device in accordance with the present invention will be described hereinbelow.

Figure 15:
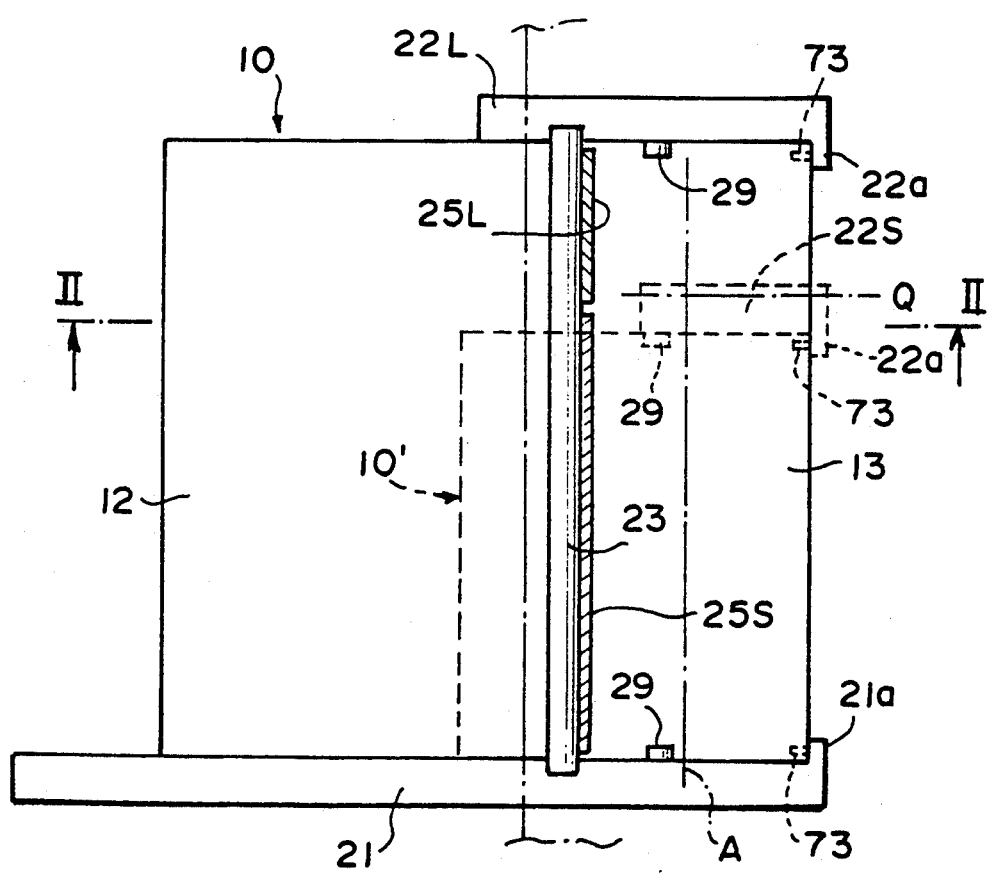
FIG. 15 is a plan view showing a first embodiment of the second cassette setting device in accordance with the present invention.
Figure 16:
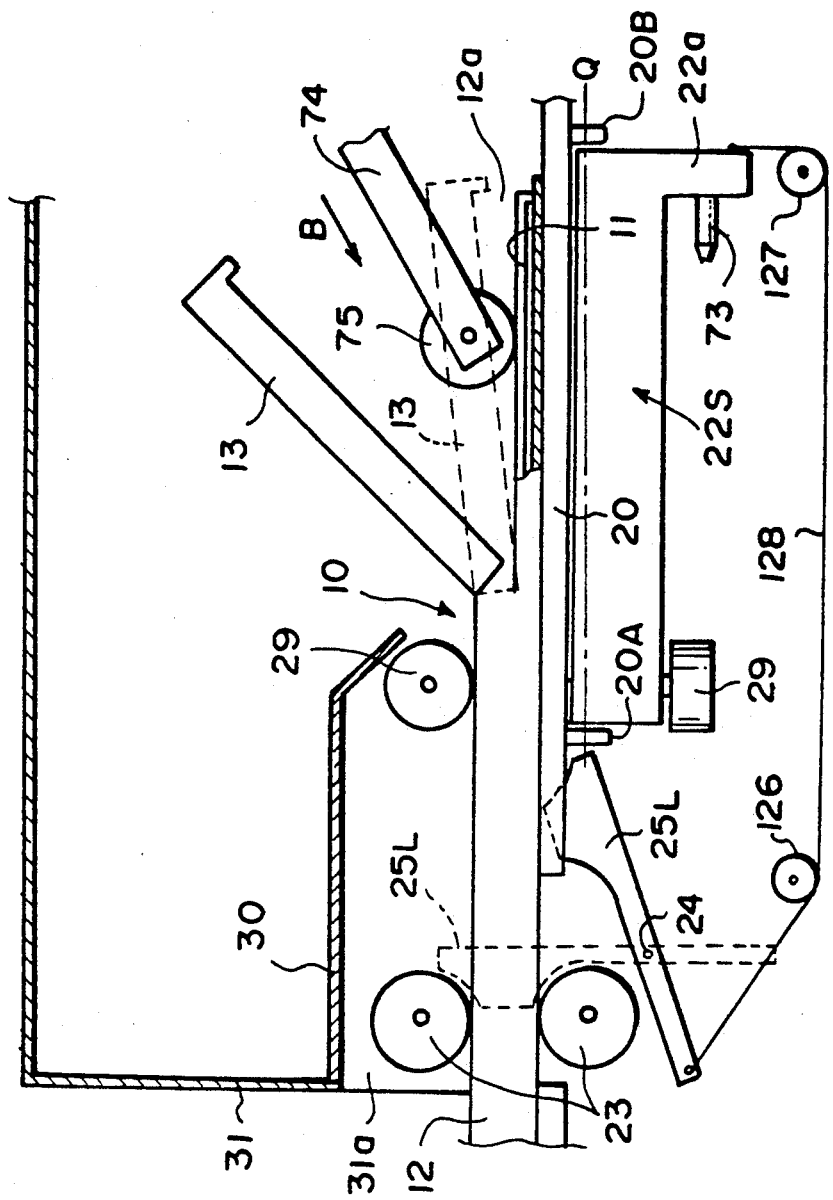
FIG. 16 is a partially cutaway side view showing the first embodiment of the second cassette setting device in accordance with the present invention.

FIG. 15 shows a first embodiment of the second cassette setting device in accordance with the present invention. FIG. 16 is a side view taken along line II—II of FIG. 15. In FIGS. 15 and 16, similar elements are numbered with the same reference numerals with respect to FIGS. 1 and 2. (This also applies to the drawings that follow.) By way of example, the cassette setting device is built in the radiation image read-out apparatus 40 shown in FIG. 5 in order to set either one of a comparatively large-sized cassette 10 (which is indicated by the solid line in FIG. 15) and a comparatively small-sized cassette 10' (which is indicated by the broken line in FIG. 15) at a predetermined position.

Figure 4:
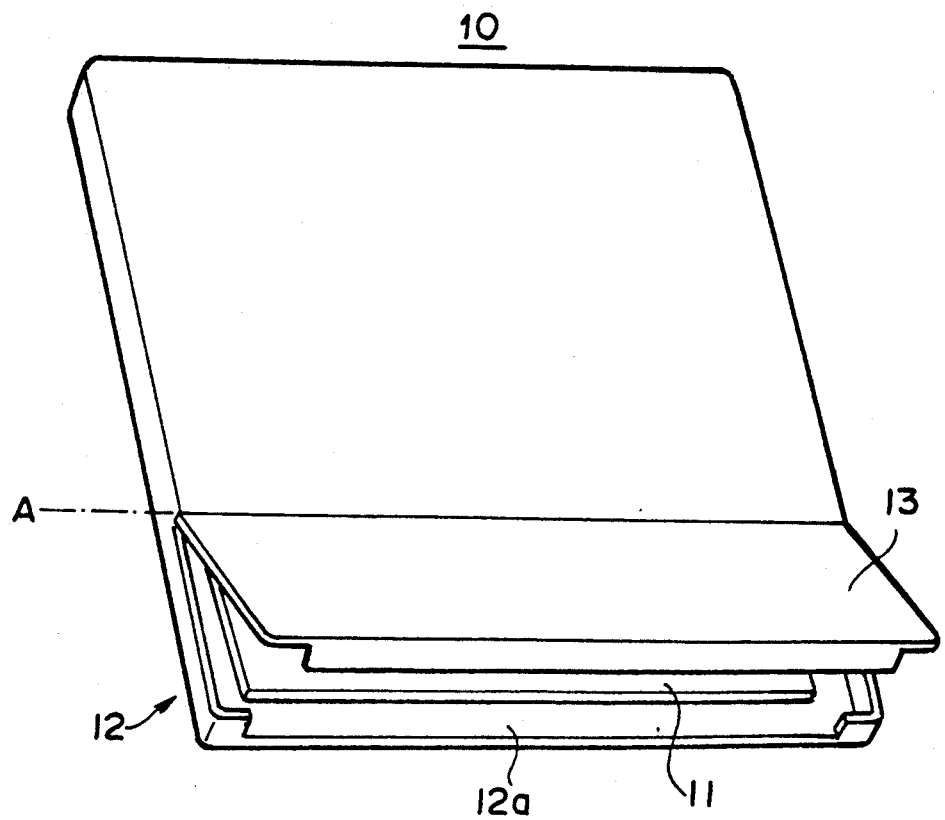
FIG. 4 is a perspective view showing an example of a cassette processed in the first cassette setting device in accordance with the present invention.

The large-sized cassette 10 has the structure shown in FIG. 4. Basically, the small-sized cassette 10' is constituted in the same manner a that in the large-sized cassette 10, except for the cassette size. In the cassettes 10 and 10', the length of the cover member 13 (i.e. the length from the swing axis A to the leading end of the cover member 13) is kept the same such that the stimulable phosphor sheet 11 can be taken out of and housed in each of the cassettes 10 and 10' by utilizing a common means.

A radiation image is stored on the stimulable phosphor sheet 11 having been housed in the cassette 10 or the cassette 10', and the cassette 10 or the cassette 10' is then loaded to the cassette setting device shown in FIGS. 15 and 16. How the cassette setting device is constructed will be described hereinbelow. As illustrated, the cassette setting device comprises the support base 20 on which the cassette 10 or the cassette 10' is placed, and the fixed guide member 21 which adjusts the position of the right side end of the cassette 10 or the cassette 10' (i.e. the lower end thereof in FIG. 15) from the exterior of the cassette 10 or the cassette 10'. The cassette setting device also comprises a movable guide member 22S and a movable guide member 22L, which are located parallel to the fixed guide member 21 and which are spaced apart from the fixed guide member 21 in the width direction of the cassette 10 or the cassette 10'. The cassette setting device further comprises the pair of light shielding rollers 23, 23, and movable light shielding plates 25S and 25L, which can rotate around a shaft 24 in FIG. 16.

Figure 17:
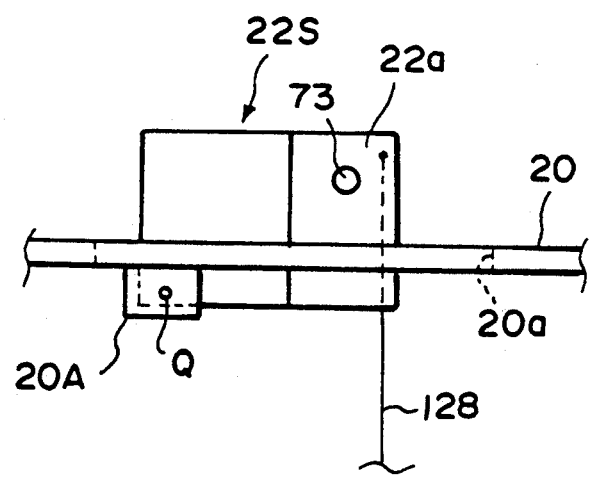
FIG. 17 is a front view showing the major part of the first embodiment of the second cassette setting device in accordance with the present invention.
Figure 18:
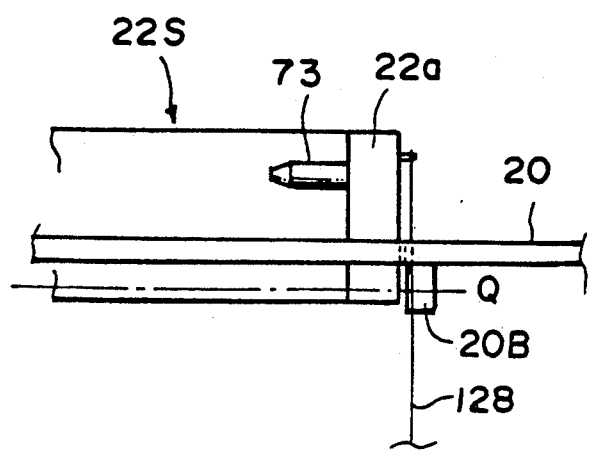
FIG. 18 is a side view showing the major part of the first embodiment of the second cassette setting device in accordance with the present invention.

As illustrated in the front view in FIG. 17 and the side view in FIG. 18, the movable guide member 22S is held by holding members 20A and 20B, which are secured to the support base 20. The movable guide member 22S can rotate around a rotation shaft Q extending parallel to the direction, along which the cassette is inserted, (i.e. the horizontal direction in FIG. 15). The support base 20 has an opening 20a, which allows the movable guide member 22S to rotated in this manner. Also, the movable guide member 22S is urged in the counter-clockwise rotating direction in FIG. 17 by a torsion coil spring (not shown), which is combined with the rotation shaft Q. Unless other external force is applied, the movable guide member 22S is brought into contact with a stopper (not shown) and is kept in the upright orientation shown in FIGS. 17 and 18.

When the movable guide member 22S is in the upright orientation, the movable guide member 22S takes the position indicated by the broken line in FIG. 15 (i.e. the position for guiding the small-sized cassette), at which the distance between the movable guide member 22S and the fixed guide member 21 is slightly larger than the width of the small-sized cassette 10'. The fixed guide member 22L is fixed at the position, at which the distance from the fixed guide member 21 is slightly larger than the width of the large-sized cassette 10.

One end of a wire 128 is connected to a stopper 22a of the movable guide member 22S. The wire 128 is threaded over pulleys 126 and 127, and the other end thereof is connected to the lower end of the movable light shielding plate 25L. The movable light shielding plates 25S and 25L are urged in the counter-clockwise rotating direction in FIG. 16 around the shaft 24. Unless other external force is applied, the movable light shielding plates 25S and 25L are brought into contact with stoppers (not shown) and take the light shielding positions (i.e. the positions indicated by the broken line in FIG. 16) at which they block external light from entering through the gap between the pair of the light shielding rollers 23, 23.

Lock rollers 29, 29, 29 are respectively mounted on the movable guide member 22S and the fixed guide members 21 and 22L such that the lock rollers 29, 29, 29 can rotate. Each roller of the pair of the light shielding rollers 23, 23 is slightly longer than the width of the large-sized cassette 10. The pair of the light shielding rollers 23, 23 are urged by an urging means (not shown) towards each other and are kept in slightly spaced relation to each other by stoppers (not shown). The radiation image read-out apparatus 40 is provided with the frame 30, which covers the upper roller of the pair of the light shielding rollers 23, 23, and the frame 31 which has the cassette setting port 31a.

How the cassette setting device operates will be described hereinbelow. When the large-sized cassette 10 is set, its one end provided with the opening 12a is inserted through the cassette setting port 31a of the frame 31 into the space between the pair of the light shielding rollers 23, 23. At this time, the pair of the light shielding rollers 23, 23 are slightly moved away from each other and receive the large-sized cassette 10 therebetween. When the cassette 10 is further inserted, the movable light shielding plates 25S and 25L, which have been set at the light shielding positions, are pushed by the large-sized cassette 10 and are thereby rotated so as to incline forwardly. In this manner, the movable light shielding plates 25S and 25L are brought to the retracted positions that do not obstruct the passage of the large-sized cassette 10. In FIG. 16, only the movable light shielding plate 25L located at the retracted position is indicated by the solid line. The other movable light shielding plate 25S also takes the same position as the movable light shielding plate 25L.

When movable light shielding plate 25L is rotated in the manner described above, the wire 128 is pulled by the movable light shielding plate 25L, and therefore the movable guide member 22S is rotated clockwise in FIG. 17 around the rotation shaft Q. In this manner, when the movable light shielding plate 25L is brought to the retracted position, the movable guide member 22S moves to the retracted position (i.e. the position shown in FIG. 16) that is lower than the upper surface of the support base 20. When the movable light shielding plate 25L is set at this position, the large-sized cassette 10 can be pushed and inserted into the predetermined without interfering with the movable guide member 22S. When the large-sized cassette 10 has been inserted to the predetermined position, the leading end thereof comes into contact with stoppers 21a and 22a, which are respectively formed on the fixed guide members 21 and 22L, and the cassette 10 is thereby set at the predetermined position.

The operations for taking the stimulable phosphor sheet 11 out of the large-sized cassette 10 and for housing it in the large-sized cassette 10 are carried out in the same manner as that in the embodiment of FIG. 1.

As illustrated in FIG. 15, the stoppers 21a and 22a of the fixed guide members 21 and 22L are provided with the lock releasing pins 73, 73. Each of the lock releasing pins 73, 73 passes through a pin passage hole, which is formed in the leading end face of the cassette 10, and enters the cassette in order to release the engagement of locking members, which locks the cover member 13 in the closed state. (An example of such a lock releasing pin is disclosed in, for example, Japanese Unexamined Patent Publication No. 63(1988)-103231.) A similar lock releasing pin 73 is also mounted on a stopper 22a of the movable guide member 22S.

When the large-sized cassette 10 is set in the manner described above, the region around the opening 12a formed at one end of the cassette 10 must be shielded from external light. In this case, the light shielding is accomplished by the frames 30 and 31, the fixed guide members 21 and 22L, and the pair of the light shielding rollers 23, 23. Any of other small gaps may be shielded from light by use of known materials, such as sponges or light blocking cloths.

How the small-sized cassette 10' is set will be described hereinbelow. In this case, the small-sized cassette 10' is inserted to the space between the pair of the light shielding rollers 23, 23 while one side end of the small-sized cassette 10' is in contact with the fixed guide member 21. At this time, the small-sized cassette 10' having the small width does not come into contact with the movable light shielding plate 25L. Therefore, in this case, the movable light shielding plate 25L is not pushed down and is kept at the light shielding position. Therefore, even if the cassette 10' smaller than the cassette setting port 31a is set, no external light enter from the space between the cassette 10' and the fixed guide member 22L into the cassette setting device.

Also, as described above, the movable light shielding plate 25L is not pushed down. Therefore, the wire 128 is not pulled by the movable light shielding plate 25L, and the movable guide member 22S is kept at the upright position for guiding the small-sized cassette 10'. In this manner, the position of the small-sized cassette 10', which is being inserted, can be adjusted by the movable guide member 22S and the fixed guide member 21, and the small-sized cassette 10' can thereby be set at the predetermined position. The operations for taking the stimulable phosphor sheet 11 out of the small-sized cassette 10' and for housing it in the small-sized cassette 10' are carried out in the same manner as that for the large-sized cassette 10.

Figure 19:
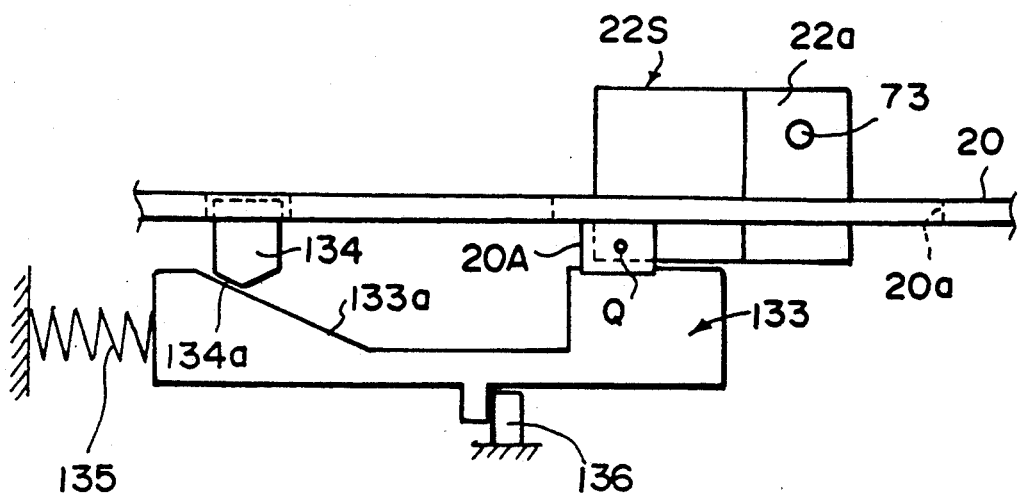
FIG. 19 is a front view showing a different example of an interlocking mechanism employed in the second cassette setting device in accordance with the present invention.
Figure 20:
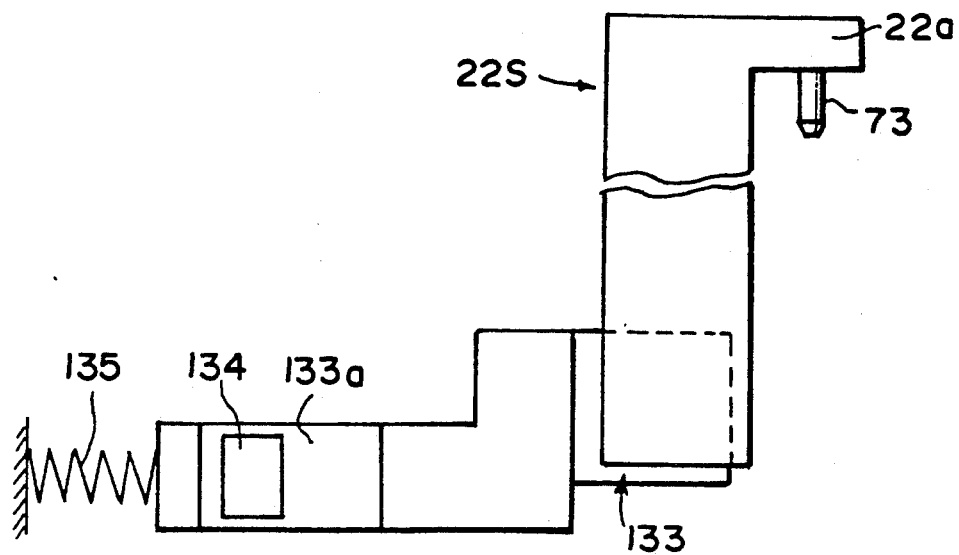
FIG. 20 is a plan view showing the interlocking mechanism of FIG. 19.

In the aforesaid embodiment of the second cassette setting device in accordance with the present invention, the mechanism for interlocking the movable guide member 22S for the small-sized cassette 10' with the movable light shielding plate 25L is constituted of the pulleys 126, 127 and the wire 128. Alternatively, in the second cassette setting device in accordance with the present invention, any of other interlocking mechanisms may be employed. FIG. 19 is a front view showing a different example of the interlocking mechanism. FIG. 20 is a plan view of the interlocking mechanism of FIG. 19. In FIGS. 19 and 20, similar elements are numbered with the same reference numerals with respect to FIGS. 15, 16, 17, and 18.

With reference to FIGS. 19 and 20, a slide member 133 having a slant surface 133a as a portion of the upper surface is held by a holding means (not shown) such that the slide member 133 can smoothly move along the width direction of the cassette 10 or the cassette 10' (i.e. along the horizontal direction in FIG. 19). The slide member 133 is urged by a compression coiled spring 135 to the right side in FIG. 19. Unless other external force is applied, the slide member 133 is brought into contact with a stopper 136 and takes the position shown in FIGS. 19 and 20. An interlocking member 134 having a slant surface 134a is held above the slant surface 133a such that the interlocking member 134 can smoothly move up and down. The interlocking member 134 is located such that the slant surface 134a may be in contact with the slant surface 133a. The movable guide member 22S is not urged to rotate as in the first embodiment of the second cassette setting device in accordance with the present invention, and can freely rotate around the rotation shaft Q.

When the small-sized cassette 10' is set, the slide member 133 is set at the position shown and supports the movable guide member 22S from below such that the movable guide member 22S may be kept in the upright position. Therefore, the movable guide member 22S can adjust the position of one side end of the small-sized cassette 10'. A protrusion is formed on the upper end of a movable light shielding plate 25L, which is of the same type as the movable light shielding plate 25L shown in FIG. 16. When the movable light shielding plate 25L is pushed down during the setting of the large-sized cassette 10, the protrusion of the movable light shielding plate 25L pushes down the interlocking member 134. When the interlocking member 134 is thus pushed down, by the effects of the slant surfaces 133a and 134a, the slide member 133 is moved a predetermined distance to the left in FIG. 19 against the urging force of the compression coiled spring 135. As a result, the slide member 133 disengages from the movable guide member 22S, and the movable guide member 22S rotates by gravity approximately 90° around the rotation shaft Q. In this manner, the movable guide member 22S sinks to the position lower than the upper surface of the support base 20. Therefore, the large-sized cassette 10 can be set at the predetermined position without being obstructed by the movable guide member 22S.

Figure 5:
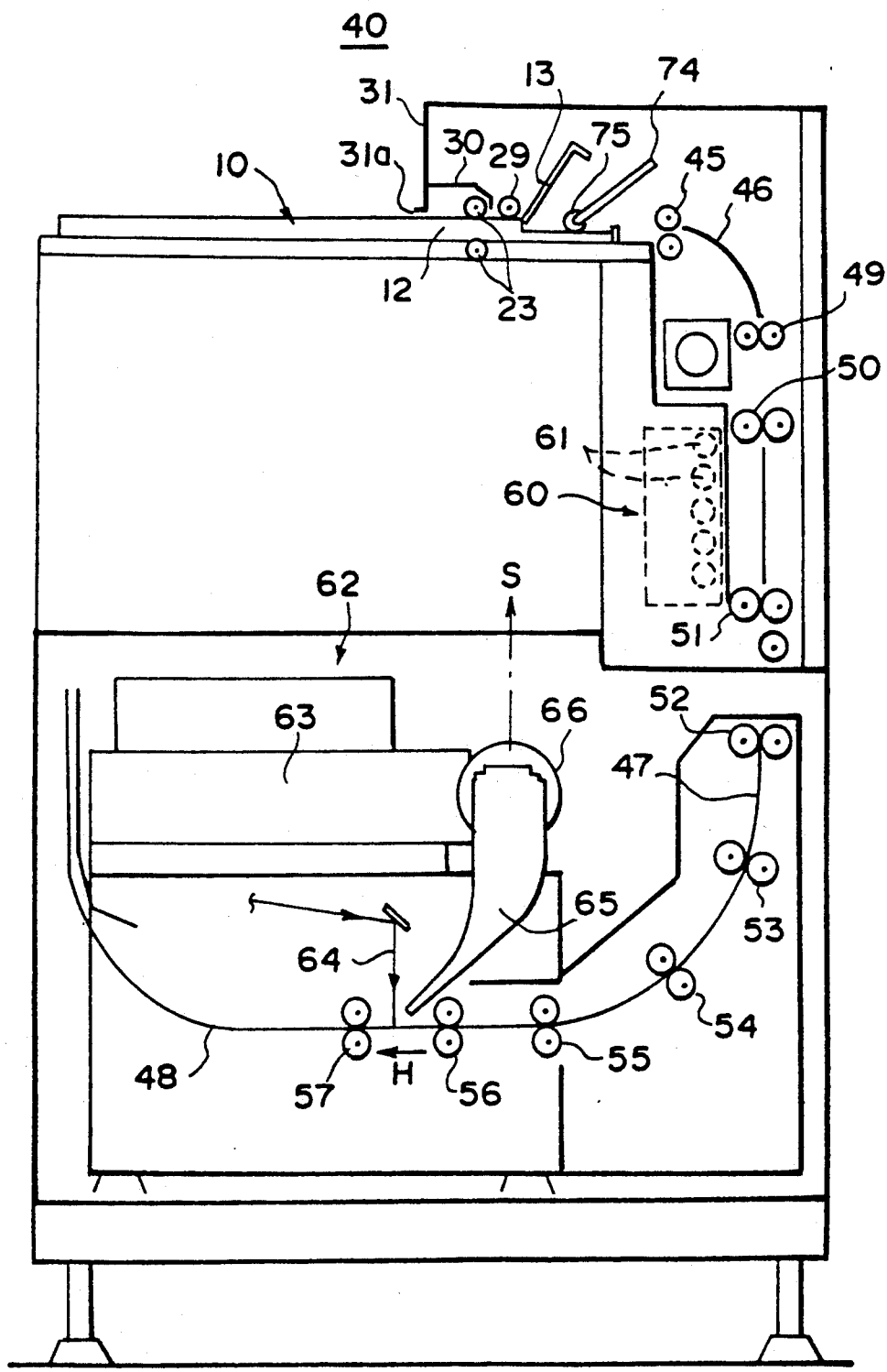
FIG. 5 is a schematic side view showing a radiation image read-out apparatus to which a cassette is loaded.

When the movable light shielding plate 25L is returned to the upright position, the slide member 133 is returned by the compression coiled spring 135 to the original position (i.e. the position shown in FIGS. 5 and 6). Therefore, the interlocking member 134 moves up to the original position.

In the aforesaid embodiments of the second cassette setting device in accordance with the present invention, a single fixed guide member 21 is utilized for both the large-sized cassette 10 and the small-sized cassette 10'. Alternatively, a pair of guide members for the large-sized cassette and a pair of guide members for the small-sized cassette may be provided independently. In such cases, both of the pair of the guide members for the small-sized cassette may be operated in the same manner as that for the movable guide member 22S employed in the aforesaid embodiments.

The second cassette setting device in accordance with the present invention may be constituted such that three or more kinds of cassettes having different sizes can be set. Also, in the aforesaid embodiments of the second cassette setting device in accordance with the present invention, the cassette 10 or the cassette 10', in which the stimulable phosphor sheet 11 is housed, is set. The second cassette setting device in accordance with the present invention is also applicable when a cassette, in which a sheet-shaped image recording medium other than the stimulable phosphor sheet is housed, is set.

What is claimed is:

1. A cassette setting device for setting a cassette at a predetermined position in a cassette utilizing apparatus, the cassette housing a sheet-shaped image recording medium therein and being provided with an opening, through which the image recording medium is to be fed into and out of the cassette, at one end, the cassette setting device setting the cassette such that the positions of two side ends of the cassette, which side ends are normal to the one end of the cassette provided with the opening, may be adjusted by a pair of guide members, and such that the other end portion of the cassette may be exposed to the exterior from a cassette setting port of the cassette utilizing apparatus, wherein the improvement comprises constituting at least either one of the pair of the guide members as a movable guide such that the distance between the guide members may be changed, and providing:
i) a stationary light shielding member, which prevents external light from entering from the side of the other end portion of the cassette to the side of the one end of the cassette when the cassette is set, and
ii) a movable light shielding member, which is capable of moving so as not to obstruct the movement of said movable guide and which prevents external light from entering from the side outward from said movable guide to the side of the one end of the cassette.

2. A device as defined in claim 1 wherein said stationary light shielding member comprises a pair of light shielding rollers, which are slightly longer than the width of a largest-sized cassette among cassettes to be set, which are urged by an urging means towards each other, and which are kept in slightly spaced relation to each other by stoppers such that the cassette may pass through a space between said light shielding rollers.

3. A device as defined in claim 1 wherein said movable light shielding member comprises a movable light shielding plate, which is constituted of a flat spring, and which is capable of swinging around a shaft such that a leading end of the movable light shielding plate is always kept in close contact with a light shielding plate secured to said movable guide.

4. A device as defined in claim 1 wherein said movable light shielding member comprises a bellows type of movable light shielding plate, one end of which is connected to said movable guide, and the other end of which is secured to the cassette utilizing apparatus.

5. A device as defined in claim 1 wherein said movable light shielding member comprises a measuring tape type of movable light shielding plate, one end of which is connected to said movable guide, and the other end of which is secure to a wind-up shaft.

6. A device as defined in claim 1 wherein said movable light shielding member comprises a movable light shielding cover, which is capable of turning around a turning shaft secured to the cassette utilizing apparatus, which takes a retracted position that is outward from a large-sized cassette having a comparatively large width when the large-sized cassette is set, and which takes a light shielding position at which a leading end of said movable light shielding cover is in contact with said movable guide when the small-sized cassette is set.

7. A device as defined in claim 1 wherein said movable light shielding member comprises a movable light shielding cover, which has a wedge-like sectional shape, which is located such that its outer side end may be in contact with an inner side end of said movable guide during the setting of a large-sized cassette having a comparatively large width and such that its inner side end may be in contact with an outer side end of said movable guide during the setting of a small-sized cassette having a comparatively small width, and which is capable of turning around a turning shaft so as to take a retracted position that is away from said stationary light shielding member and a light shielding position that stands facing said stationary light shielding member.

8. A device as defined in claim 1 wherein the image recording medium is a stimulable phosphor sheet.

9. A device as defined in claim 1 wherein the image recording medium is photographic film.

10. A cassette setting device for setting a cassette at a predetermined position in a cassette utilizing apparatus, the cassette housing a sheet-shaped image recording medium therein and being provided with an opening, through which the image recording medium is to be fed into and out of the cassette, at one end, the cassette setting device setting the cassette such that the positions of two side ends of the cassette, which side ends are normal to the one end of the cassette provided with the opening, may be adjusted by a pair of guide members, and such that the other end portion of the cassette may be exposed to the exterior from a cassette setting port of the cassette utilizing apparatus, wherein the improvement comprises the provision of;
i) a stationary light shielding member, which prevents external light from entering from the side of the other end portion of the cassette to the side of the one end of the cassette when the cassette is set,
ii) a pair of guide members, which serves as the pair of the guide members for a large-sized cassette having a comparatively large width,
iii) a pair of guide members, which serves as the pair of the guide members for a small-sized cassette having a comparatively small width, at least either one of said pair of said guide members for the small-sized cassette, which one is located at a position for the setting of the large-sized cassette, being capable of moving between a retracted position, that does not interfere with the large-sized cassette, and a position for the guiding of the small-sized cassette,
iv) a movable light shielding member, which is located in the vicinity of the cassette setting port, which prevents external light from entering from the cassette setting port to the side of the one end of the cassette when the small-sized cassette is set, and which is moved by the large-sized cassette to a retracted position, that does not obstruct the passage of the large-sized cassette, when the large-sized cassette passes through the location of the movable light shielding member, and
v) an interlocking mechanism for interlocking said movable light shielding member and said guide member for the small-sized cassette, which guide member is located at the position for the setting of the large-sized cassette, with each other such that said guide member for the small-sized cassette may be moved to the retracted position thereof when said movable light shielding member is moved to the retracted position thereof.

11. A device as defined in claim 10 wherein one of said pair of said guide members for the large-sized cassette and one of said pair of said guide members for the small-sized cassette are common to each other.

12. A device as defined in claim 10 wherein the image recording medium is a stimulable phosphor sheet.

13. A device as defined in claim 10 wherein the image recording medium is photographic film.

14. A device as defined in claim 10 wherein said stationary light shielding member comprises a pair of light shielding rollers, which are slightly longer than the width of a largest-sized cassette among cassettes to be set, which are urged by an urging means towards each other, and which are kept in slightly spaced relation to each other by stoppers such that the cassette may pass through a space between said light shielding rollers.

* * * * *